US005855477A

United States Patent [19]

Tanino

[11] Patent Number: 5,855,477

[45] Date of Patent: Jan. 5, 1999

[54] BELT CONVEYANCE BAKING FURNACE

[75] Inventor: Isao Tanino, Shiga-ken, Japan

[73] Assignee: Murata Manufacturing Co., Ltd., Nagaokakyo, Japan

[21] Appl. No.: 740,305

[22] Filed: Oct. 28, 1996

[30] Foreign Application Priority Data

Oct. 30, 1995 [JP] Japan .................................... 7-306950

[51] Int. Cl.[6] .............................. B65G 23/04; F27D 3/00

[52] U.S. Cl. .......................... 432/243; 198/830; 198/832; 198/835

[58] Field of Search .................................... 432/121, 239, 432/243, 246; 198/830, 832, 834, 835, 846, 848

[56] References Cited

U.S. PATENT DOCUMENTS

| | | | |
|---|---|---|---|
| 2,732,059 | 1/1956 | Erisman | 198/830 |
| 3,733,173 | 5/1973 | Csapo et al. | 432/245 |
| 3,750,904 | 8/1973 | Wisler | 198/835 |
| 3,756,376 | 9/1973 | Kurger et al. | 198/783 |
| 3,820,650 | 6/1974 | Garvey | 198/830 |
| 3,869,574 | 3/1975 | Kume | 198/830 |
| 4,363,399 | 12/1982 | Ludwig et al. | 198/830 |
| 4,389,562 | 6/1983 | Chaudoir | 432/239 |
| 5,242,156 | 9/1993 | Kay | 432/243 |
| 5,261,527 | 11/1993 | Krismanth et al. | 198/833 |

*Primary Examiner*—Teresa J. Walberg
*Assistant Examiner*—Gregory A. Wilson
*Attorney, Agent, or Firm*—Burns, Doane, Swecker & Mathis, LLP

[57] ABSTRACT

A belt conveyance baking furnace which can reduce the weight and size of a belt and can raise and lower the furnace temperature to desired levels in a shorter time. A workpiece is baked while it is on a conveyor belt and conveyed through the furnace therewith. A table roller (31) for driving a conveyor belt (30) is disposed at least one of an entry section and a delivery section of the furnace. A plurality of furnace bed rollers (15) supporting the lower surface of the conveyor belt (30) and driven at the same circumferential speed as the table roller (31) are arranged side by side in the furnace in the longitudinal direction. Since the conveyor belt (30) runs while rolling over the furnace bed rollers (15), the friction force between the conveyor belt and the furnace bed rollers is practically negligible. It is hence possible to considerably reduce the weight and heat capacity of the conveyor belt as compared with a conventional conveyor belt.

21 Claims, 8 Drawing Sheets

BELT CONVEYANCE BAKING FURNACE

BACKGROUND OF THE INVENTION

1. Field of the Invention

The present invention relates to a belt conveyance baking furnace suitable for heat treatment of a small workpiece to be baked.

2. Description of the Related Art

Heretofore, when baking small ceramic parts such as ceramic capacitors or firing external electrodes, a mesh belt type continuous baking furnace as shown in FIGS. 1 to 3 has been employed. This baking furnace includes a furnace body 1 associated with an entry section 1*a*, a heating section 1*b*, a cooling section 1*c*, and a delivery section 1*d*. A tubular muffle 2 is disposed inside the furnace body 1 to extend over both the heating section 1*b* and the cooling section 1*c*. A mesh belt 3 extends through the muffle 2 and is driven to run by a drive roller 4 so that a workpiece on the belt 3 is heat-treated while it is continuously conveyed with the belt 3. Additionally, denoted by 5 is a motor, 6 are table rollers, and 7 are tension rollers.

In some cases, the mesh belt 3 directly contacts the bottom of the muffle 2. In other cases, rails made of metal or quartz are laid on the bottom of the muffle 2 to support the mesh belt 3 on the rails.

In the belt conveyance baking furnace as mentioned above, however, since the mesh belt 3 is driven to run while contacting the muffle 2 or the rails, the mesh belt 3 is subjected to friction resistance (usually the coefficient of friction f=0.3–0.5) and hence undergoes a large tension. Therefore, the mesh belt 3 must have the strength endurable against such a large tension, which has been disadvantageous in increasing the weight and size of the belt. Also, the large belt weight increases heat capacity of the member moving through the furnace. It has thus been difficult to raise and lower the furnace temperature to desired levels in a short time (e.g., within 20 minutes).

FIG. 4 shows one example of a temperature profile of the baking furnace shown in FIG. 1. As is apparent from FIG. 4, because of the mesh belt 3 having large heat capacity, a characteristic curve in the temperature raising process is so gentle that it takes about 20 minutes to raise the furnace temperature by 900° C. Similarly, in the temperature lowering process, it takes about 30 minutes to lower the furnace temperature by 700° C. Accordingly, there have been problems that the baking needs an inconvenient amount of time and the treatment efficiency is poor.

SUMMARY OF THE INVENTION

It is, therefore, an object of the present invention to provide a belt conveyance baking furnace which can reduce the weight and size of a belt and can raise and lower the furnace temperature to desired levels in a shorter time.

To achieve the above object, according to the present invention, in a belt conveyance baking furnace in which a workpiece to be baked is subjected to baking while the workpiece is located on a conveyor belt and conveyed through the furnace therewith, a drive roller for driving the conveyor belt is disposed outside the furnace, and a plurality of furnace bed rollers supporting the lower surface of the conveyor belt and driven at the same circumferential speed as the drive roller are arranged in the furnace side by side in the longitudinal direction.

In the present invention, a workpiece to be baked is loaded into the furnace and placed on a conveyor belt driven to run through the furnace. The conveyor belt is driven by a drive roller disposed in at least one of an entry section and a delivery section of the furnace. A plurality of furnace bed rollers supporting the conveyor belt are arranged side by side in the furnace and are driven at the same circumferential speed as the drive roller. Therefore, the conveyor belt runs while rolling over the furnace bed rollers.

By contrast with the conventional belt conveyance baking furnace undergoing slide friction, because the baking furnace of the present invention undergoes rolling friction, the coefficient of friction can be held not more than 0.05 and the friction force between the conveyor belt and the furnace bed rollers is practically negligible. It is therefore possible to considerably reduce the weight and heat capacity of the conveyor belt as compared with the conventional conveyor belt. As a result, the furnace temperature can be raised and lowered to desired levels in a shorter time than conventional. Also, since the amount of heat discharged out of the furnace with the belt is reduced, fuel economy can be improved.

Further, because of appreciable slide contact not occurring between the conveyor belt and the furnace bed rollers, the conveyor belt is less worn and its durability is improved.

A mesh belt can be used as the conveyor belt in the present invention. In this case, since the mesh belt has openings, the mesh belt can be driven by the drive roller without slippage by forming projection teeth, which engage the openings of the mesh belt, on the circumferential surface of the drive roller.

Further, a ceramic cloth belt can also be used as the conveyor belt in the present invention. In this case, to drive the ceramic cloth belt without slippage, projection teeth biting into the ceramic cloth belt are formed on the circumferential surface of the drive roller.

It is to be noted that the term "baking" used herein is not limited to simple baking, but includes other types of heat treatment such as binder removal and annealing. Accordingly, the workpiece to be baked is not limited to ceramic materials.

BRIEF DESCRIPTION OF THE DRAWINGS

The present invention will now be described with reference to the accompanying drawing figures, in which.

DESCRIPTION OF THE PREFERRED EMBODIMENT

Figure 5:
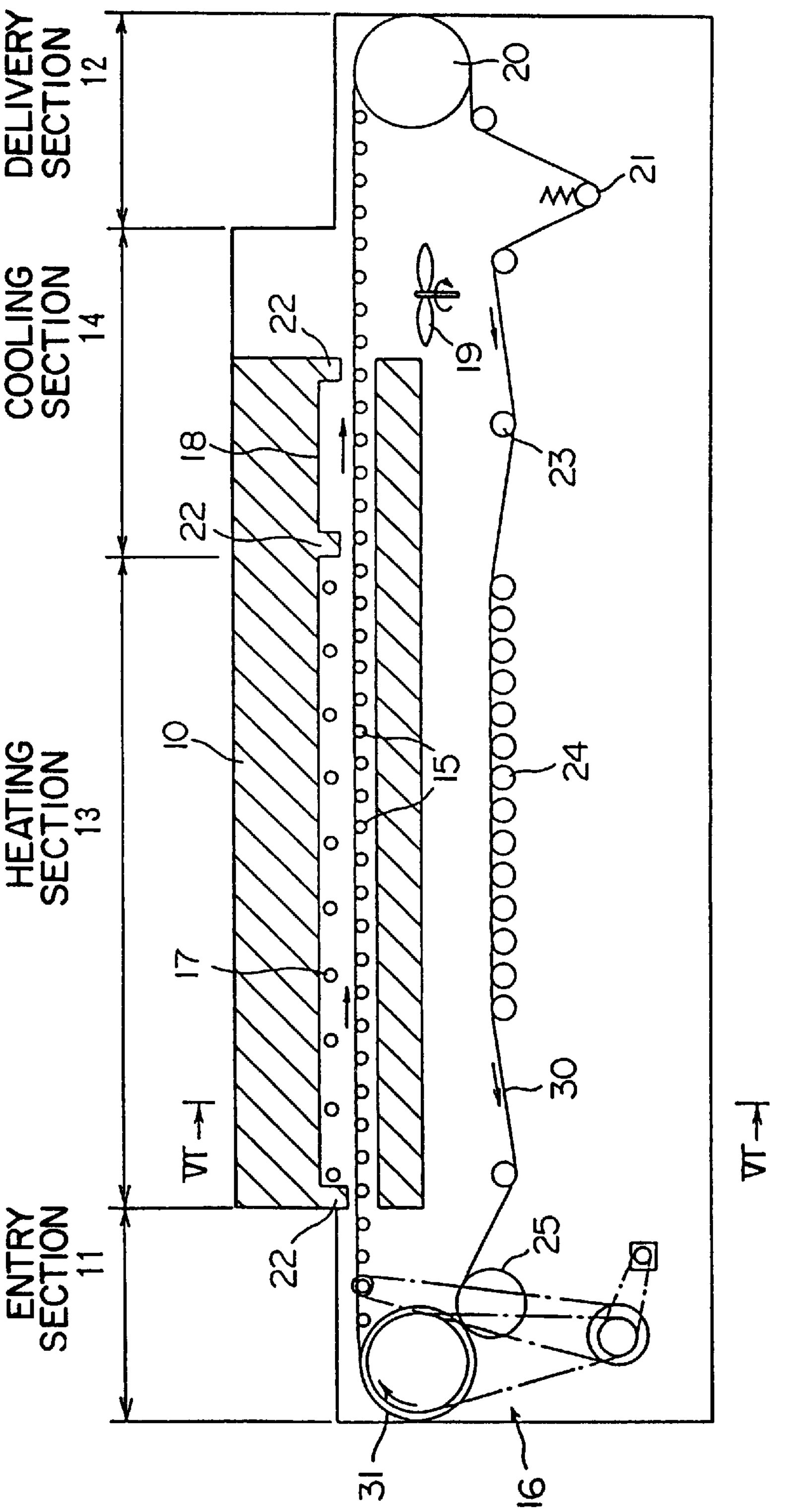
FIG. 5 is a schematic sectional view of a belt conveyance baking furnace of the present invention.
Figure 6:
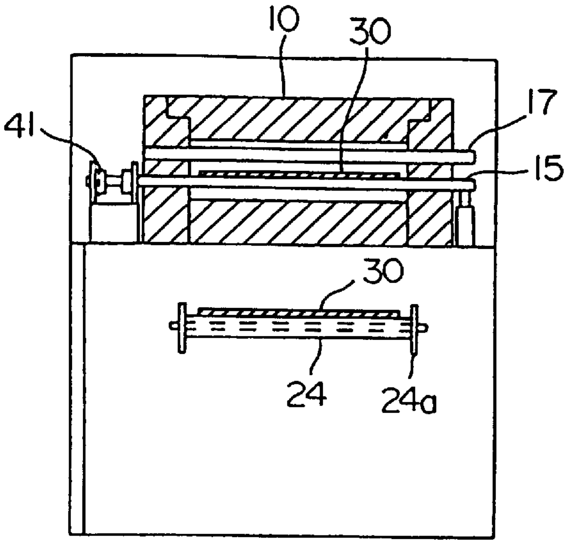
FIG. 6 is a sectional view taken along line VI—VI in FIG. 5.

FIGS. 5 and 6 show one embodiment of a baking furnace according to the present invention.

The baking furnace of this embodiment includes a furnace body 10 made of refractory materials such as bricks and other heat-resistant materials. An entry section 11 and a delivery section 12 are formed respectively one end side and the other end side of the furnace body 10. A heating section 13 and a cooling section 14 are disposed between the entry section 11 and the delivery section 12. A number of furnace bed rollers 15 are arranged side by side at a constant pitch (e.g., 50–100 mm) on a surface along which workpieces to be baked pass. A conveyor belt 30 described later runs over the furnace bed rollers 15 in rolling fashion. A belt driver 16 is disposed in the entry section 11, heaters 17 in the heating section 13, a water cooling jacket 18 and an air cooling fan 19 in the cooling section 14, and a table roller 20 and a tension roller 21 in the delivery section 12, respectively.

For the purpose of suppressing ingress and egress of heat from and to the adjacent areas, the furnace body 10 is provided at the boundaries of the heating section 13 and the cooling section 14 with boundary walls 22 each of which has an opening made as small as possible to just allow passage of the belt 30 and the workpieces to be baked.

Below the furnace body 10, there are disposed tension rollers 23, free rollers 24 and a pusher roller 25 which jointly serve to support the belt 30 on the return run side. Flanges 24*a* (see FIG. 6) are attached to both ends of each of the free rollers 24 for preventing zigzag movement of the belt 30.

Figure 7:
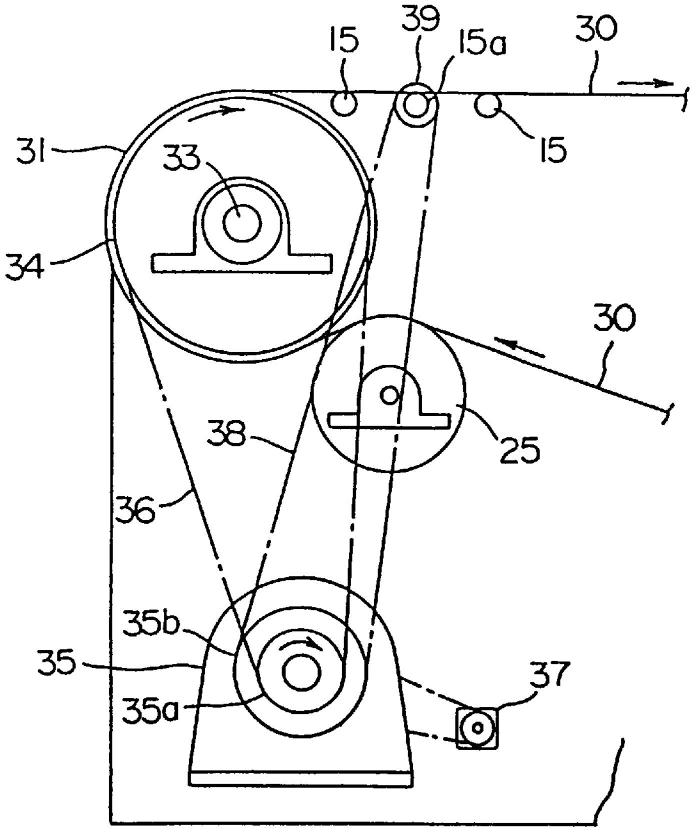
FIG. 7 is an enlarged view of a belt drive.
Figure 8:
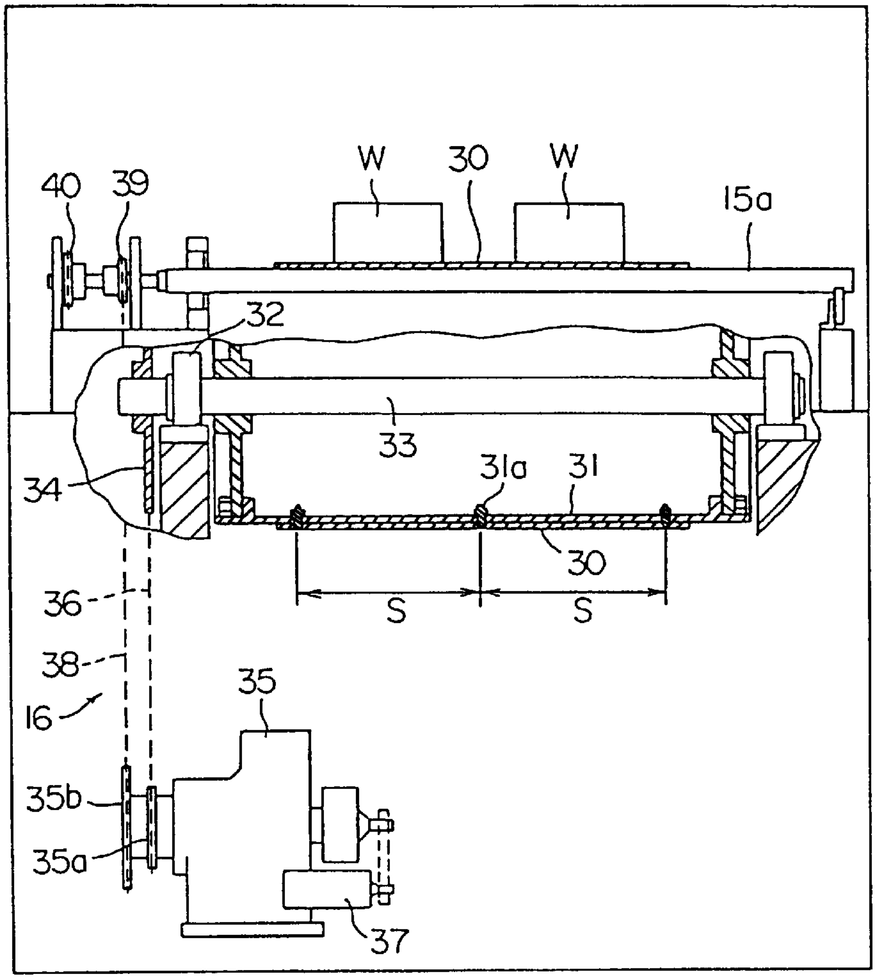
FIG. 8 is a left side view of FIG. 7.

FIGS. 7 and 8 show details of the belt driver 16 in the entry section.

The belt driver 16 includes a table roller (drive roller) 31 for driving the conveyor belt 30. The table roller 31 has a shaft 33 rotatably supported at both ends by bearings 32 (FIG. 8), and a sprocket 34 is fixed to one end of the shaft 33. A chain 36 is stretched to run between the sprocket 34 and a first sprocket 35*a* attached to an output shaft of a speed reducer 35. The speed reducer 35 is driven by a motor 37 and, therefore, the table roller 31 is driven at a constant speed by the motor 37. Further, a second sprocket 35*b* of the speed reducer 35 drives a sprocket 39 fixed to one of the furnace bed rollers 15*a* through a chain 38. The numbers of teeth of the sprockets are set so that the furnace bed roller 15*a* and the table roller 31 are driven at the same circumferential speed.

Another sprocket 40 (see FIG. 8) is fixed to an axial end of the furnace bed roller 15*a* which is driven by the motor 37, and this sprocket 40 is connected to sprockets 41 (see FIG. 6) fixed to the remaining furnace bed rollers 15 through a chain (not shown). Therefore, all the furnace bed rollers 15 can be driven in the same direction at the same speed.

Incidentally, flanges may be attached to both ends of each of the furnace bed rollers 15 for preventing zigzag movement of the belt 30.

Figure 9:
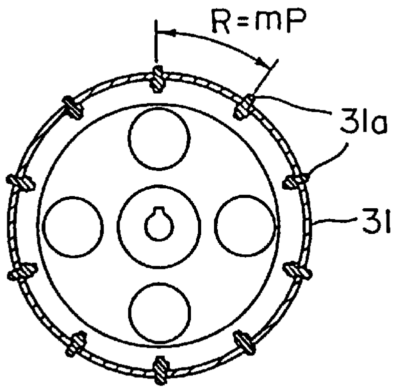
FIG. 9 is a side view of a table roller.
Figure 10:
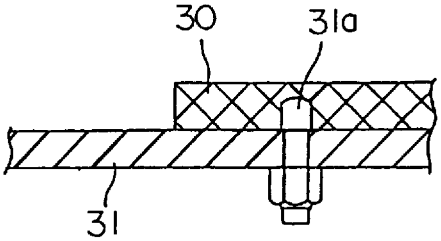
FIG. 10 is a sectional view of a table roller provided with projection teeth engaging a mesh belt.
Figure 11:
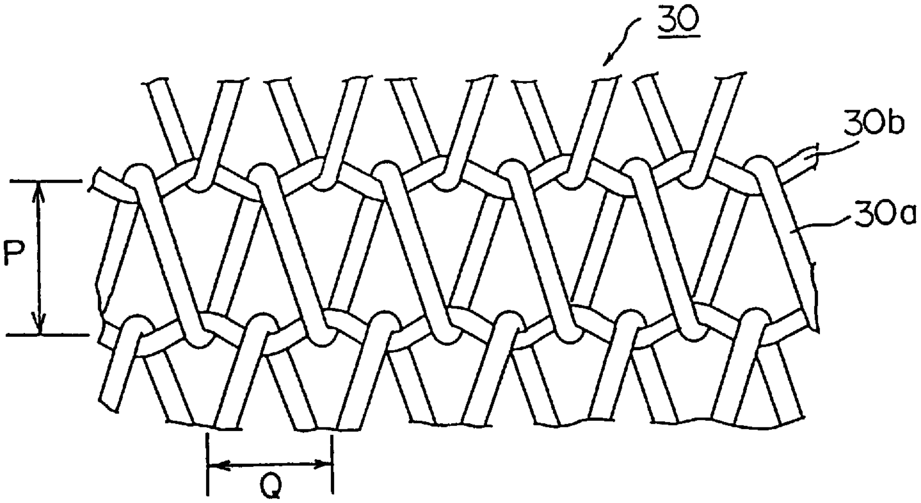
FIG. 11 is an enlarged view of the mesh belt.

The conveyor belt 30 is formed of an endless mesh belt as shown in FIG. 11, and a plurality of projection teeth 31*a* engaging openings of the mesh belt 30 are fixed to the circumferential surface of the table roller 31 (see FIGS. 9 and 10). The projection teeth 31*a* are provided at a constant spacing S in the axial direction and a constant spacing R in the circumferential direction corresponding to the spacings between the openings of the mesh belt 30. The mesh belt 30 is fabricated by combining spiral members 30*a* and skeleton members 30*b* into the form of a belt, each of these members 30*a*, 30*b* being made of heat-resistant metal wires of stainless steel, Inconel or the like. Assuming that the pitch of the mesh belt 30 in the direction of width thereof is Q and the pitch of the mesh belt 30 in the direction of length thereof is P, the spacings S, R between the projection teeth 31*a* are given by:

$$S = n \cdot Q$$

$$R = m \cdot P$$

where n and m are positive integers.

Thus, the projection teeth 31*a* of the table roller 31 function as if they are sprocket teeth, and can drive the mesh belt 30 without slippage. In addition, since the projection teeth 31*a* also serve to correct a shift of the mesh belt 30 in the transverse direction, it further contributes to prevention of zigzag movement of the mesh belt 30.

While, in the illustrated embodiment, the projection teeth 31*a* engaging the openings of the mesh belt 30 are provided so that the mesh belt 30 is driven by the table roller 31 without slippage, it is instead also possible to press the mesh belt 30 against the circumferential surface of the table roller 31 by the pusher roller 25. In this case, the projection teeth 31*a* are not necessary.

Further, while the table roller 20 on the delivery section side is a free roller in this embodiment, it may be driven by some drive means in synch with the table roller 31 on the entry section side. Additionally, projection teeth 31*a* engaging the openings of the mesh belt 30 may also be provided on the circumferential surface of the table roller 20 in the delivery section.

The operation of the baking furnace thus constructed will be described below.

Figure 1:
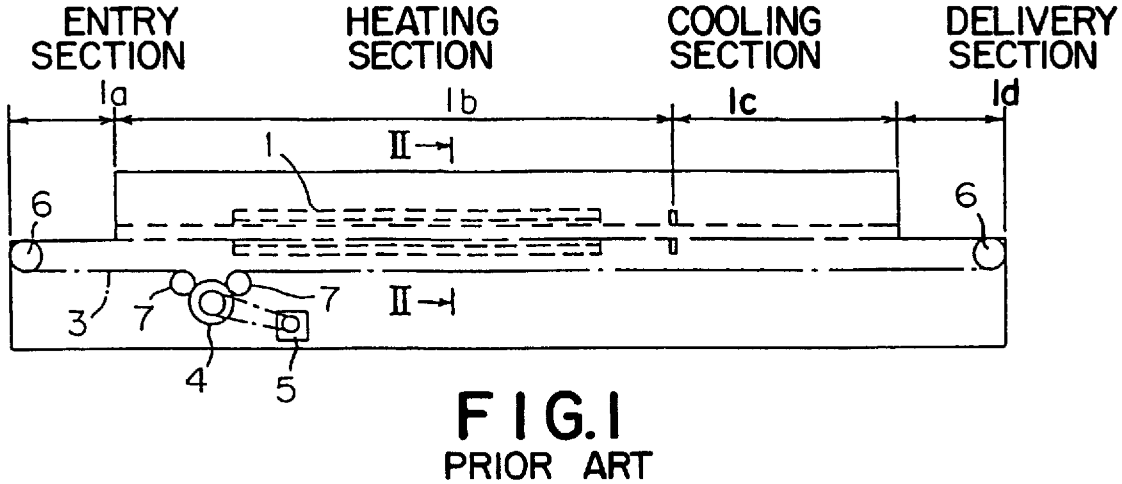
FIG. 1 PRIOR ART
FIG. 1 is a schematic sectional view of a conventional belt conveyance baking furnace.
Figure 2:
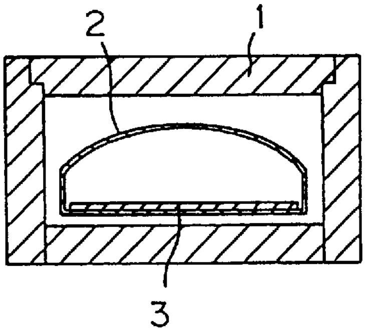
FIG. 2 PRIOR ART
FIG. 2 is a sectional view taken along line II—II in FIG. 1.
Figure 3:
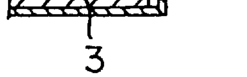
FIG. 3 PRIOR ART
FIG. 3 is an enlarged view of part of FIG. 2.
Figure 4:
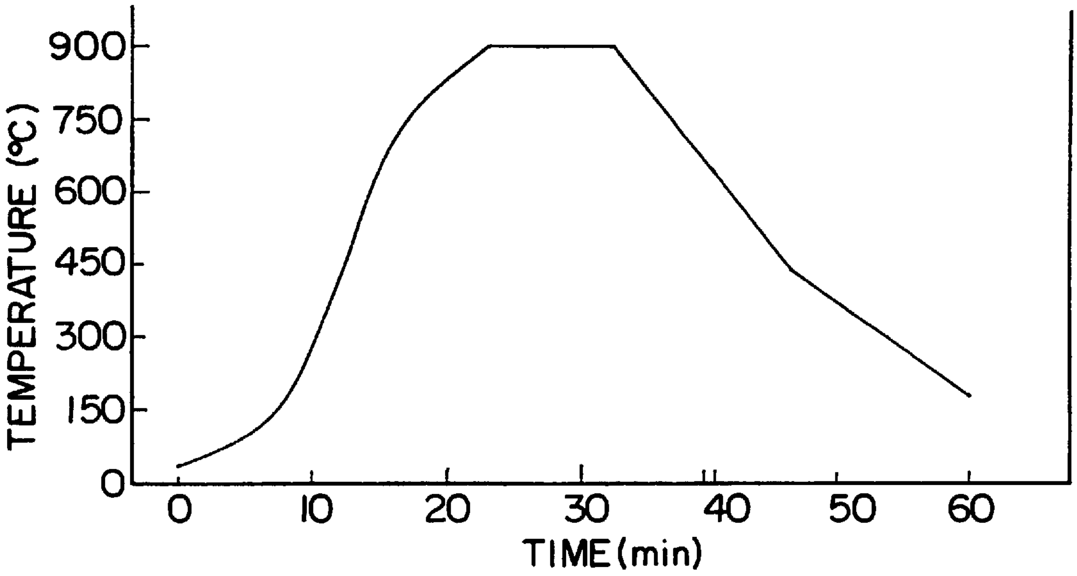
FIG. 4 PRIOR ART
FIG. 4 is a graph plotting a temperature profile of the conventional baking furnace.

When workpieces W to be baked (see FIG. 8) are placed on the mesh belt 30 and the motor 37 is energized, the table roller 31 and the furnace bed rollers 15 are driven at the same circumferential speed. Therefore, the workpieces W are conveyed through the furnace and baked while being held on the mesh belt 30. During the belt run, the lower surface of the mesh belt 30 is supported by the furnace bed rollers 15. In this respect, since the furnace bed rollers 15 and the table roller 31 are driven at the same circumferential speed, the moving speed of the mesh belt 30 is also equal to the circumferential speed of the furnace bed rollers 15. Accordingly, the mesh belt 30 moves while rolling over the furnace bed rollers 15, and the friction force between the mesh belt 30 and the furnace bed rollers 15 is practically negligible. This enables the mesh belt 30 to be wide-meshed and have a smaller wire diameter, whereby the weight of the mesh belt 30 can be reduced. As a practical example, the present invention has succeeded in reducing the weight of the mesh belt 30 to about 1/5–1/2 of the weight of the mesh belt employed in the conventional baking furnace (FIG. 1). As a result, it is possible to reduce the heat capacity of the mesh belt 30, shorten the time required for raising and lowering the furnace temperature to desired levels to 1/5–1/10 (e.g., within 20 minutes) of that required in the conventional baking furnace, and hence cut down the baking time considerably.

Figure 12:
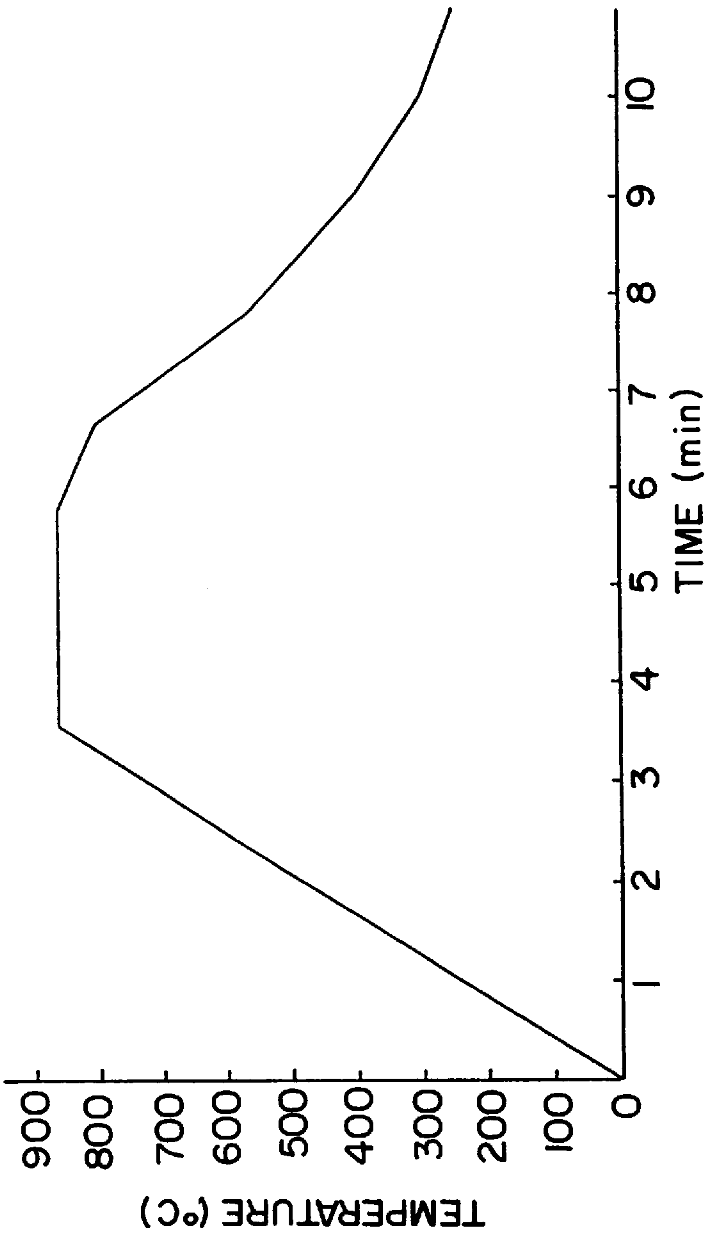
FIG. 12 is a graph plotting a temperature profile of the baking furnace of the present invention.

FIG. 12 shows a temperature profile of the baking furnace of the present invention. As is apparent from FIG. 12, the furnace temperature can be raised to about 900° C. in 3–4 minutes and can be lowered from 800° C. to 300° C. in mere four minutes. Accordingly, the time from entry to delivery of the workpieces in the baking furnace of the present invention can be cut down to ⅕–1/10 of that required in the conventional baking furnace.

Further, since the amount of heat accumulated in the mesh belt 30 is reduced, the amount of heat brought out with the mesh belt 30 going out of the furnace can be diminished. This improves the thermal efficiency and contributes to a saving in fuel consumption. Additionally, with the improved thermal efficiency, the capacity of the heaters 17 can be reduced.

Figure 13:
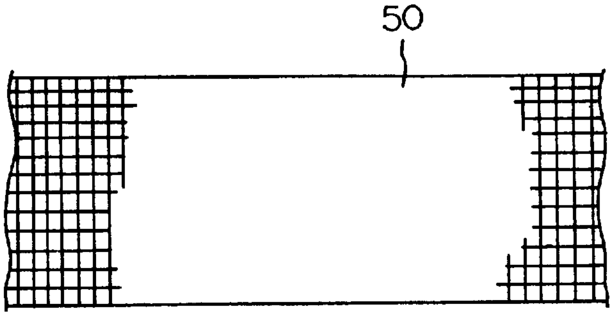
FIG. 13 is a plan view of a conveyor belt comprising a ceramic cloth belt.
Figure 14:
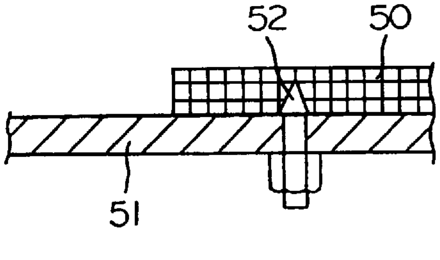
FIG. 14 is a sectional view of a table roller provided with projection teeth biting into the ceramic cloth belt.

FIG. 13 shows a second embodiment of the present invention in which a ceramic cloth belt 50 is employed as the conveyor belt. The ceramic cloth belt 50 is formed by weaving heat-resistant ceramic fibers such as made of alumina-base or vitreous materials into a fabric in the form of a tape. Because the belt 50 has flexibility, it can be driven without slippage by providing pointed projection teeth 52 on the circumferential surface of a table roller 51, as shown in FIG. 14, so that the projection teeth 52 bite into the ceramic cloth.

In this embodiment, the projection teeth 52 may be provided at any desired positions on the circumferential surface of the table roller 51.

Further, when employing the ceramic cloth belt 50, the belt may be coated with $ZrO_2$ or the like to avoid reaction between its surface and workpieces to be baked.

It should be understood that the foregoing embodiments have been described only by way of example, and the present invention can be practiced in various modified forms. Workpieces to be baked may be ceramic parts themselves or housings containing ceramic parts therein. Also, the workpieces may be other materials than ceramic parts.

The drive roller used in the present invention is not limited to the table roller disposed in the entry section like the illustrated embodiment. It may be a table roller disposed in the delivery section or in any other location. Further, the driver roller may be other than the table roller if it is a roller disposed outside the furnace body.

All the furnace bed rollers are not necessarily driven. The purpose of preventing friction of the belt can also be achieved by, e.g., arranging a number of furnace bed rollers at a narrow pitch and driving these furnace bed rollers, for example, at every second or n-th roller (n is an integer not less than two). In this case, the rollers which are not driven may be formed as free rollers.

Additionally, the conveyor belt is not limited to the mesh belt or the ceramic cloth belt so long as it has both heat-resistance and flexibility. A belt formed of ceramic fibers, for example, may also be used as the conveyor belt.

According to the present invention, as is apparent from the foregoing description, since a plurality of furnace bed rollers supporting the lower surface of a conveyor belt and driven at the same circumferential speed as a table roller are arranged side by side in the furnace, the conveyor belt runs while rolling over the furnace bed rollers. Therefore, the friction force between the conveyor belt and the furnace bed rollers is very small, enabling a light-weight conveyor belt to be used. As a result, the heat capacity of the belt is reduced and the furnace temperature can be raised and lowered to desired levels in a shorter time.

Also, since the amount of heat accumulated in the belt is reduced, the amount of heat discharged out of the furnace can be diminished. It is thus possible to improve the thermal efficiency and achieve the baking furnace with better fuel economy.

Still another advantage is that since the friction between the conveyor belt and the furnace bed rollers is small, durability of the conveyor belt or the furnace bed rollers can be improved.

Other modification will occur to those skilled in the art which are within the scope of the invention as defined in the appended claims.

What is claimed is:

1. A belt conveyance baking furnace in which a workpiece to be baked is subjected to baking while said workpiece is located on a conveyor belt and conveyed through said furnace, comprising:

a drive roller for driving said conveyor belt and which is disposed outside said furnace, a plurality of furnace bed rollers supporting the lower surface of said conveyor belt and driven at the same circumferential speed as said drive roller, said plurality of furnace bed rollers being arranged in said furnace and arranged side by side in the longitudinal direction, and means for driving said plurality of furnace bed rollers, said driving means being separate and apart from said conveyor belt.

2. A belt conveyance baking furnace according to claim 1, wherein said conveyor belt is formed of a mesh belt, and projection teeth for engaging openings of said mesh belt on the circumferential surface of said drive roller.

3. A belt conveyance baking furnace according to claim 1, wherein said conveyor belt is formed of a ceramic cloth belt, and projection teeth for biting into said ceramic cloth belt on the circumferential surface of said drive roller.

4. A belt conveyance baking furnace according to claim 1, further comprising a belt driver for driving said drive roller and including a speed reducer driven by a motor.

5. A belt conveyance baking furnace according to claim 1, further comprising a belt driver for driving said drive roller and at least one of said plurality of furnace bed rollers at the same circumferential speed, said belt driver including a speed reducer driven by a motor.

6. A belt conveyance baking furnace according to claim 5, wherein said at least one said plurality of furnace bed rollers includes a sprocket of driving the rest of said plurality of furnace bed rollers.

7. A belt conveyance baking furnace according to claim 1, wherein at least one of said plurality of furnace bed rollers includes flanges at both ends, said at least one furnace bed roller for preventing zigzag movement of the conveyor belt.

8. A belt conveyance baking furnace according to claim 1, further comprising a plurality of free rollers.

9. A belt conveyance baking furnace according to claim 1, further comprising a plurality of free rollers on a return path of said conveyor belt.

10. A belt conveyance baking furnace according to claim 1, further comprising a tension roller.

11. A belt conveyance baking furnace according to claim 1, further comprising a pusher roller.

12. A method of conveying a workpiece through a belt conveyance baking furnace, comprising the steps of:

driving a conveyor belt with a drive roller disposed outside said furnace, supporting the lower surface of said conveyor belt with a plurality of furnace bed rollers, said plurality of furnace bed rollers being arranged in said furnace and arranged side by side in the longitudinal direction, and driving said plurality of furnace bed rollers at the same circumferential speed as said drive roller by means separate and apart from said conveyor belt.

13. A method in accordance with claim 12, further comprising the step of:

engaging openings of a mesh belt with projection teeth formed on the circumferential surface of said drive roller.

14. A method in accordance with claim 12, further comprising the step of:

biting into said ceramic cloth belt with projection teeth formed on the circumferential surface of said drive roller.

15. A belt conveyance baking furnace in which a workpiece to be baked is subjected to baking while said workpiece is located on a conveyor belt and conveyed through said furnace, comprising:

a drive roller for driving said conveyor belt disposed outside said furnace, a plurality of furnace bed rollers supporting the lower surface of said conveyor belt, said plurality of furnace bed rollers being arranged in said furnace and arranged side by side in the longitudinal direction, and means for driving at least some of said plurality of furnace bed rollers are driven at the same circumferential speed as said drive roller.

16. A belt conveyance baking furnace according to claim 15, wherein n-th roller of said plurality of furnace bed rollers are driven at the same circumferential speed as said drive roller, n being an integer.

17. A belt conveyance baking furnace according to claim 15, wherein said conveyor belt is formed of a mesh belt, and projection teeth for engaging openings of said mesh belt are formed on the circumferential surface of said drive roller.

18. A belt conveyance baking furnace according to claim 15, wherein said conveyor belt is formed of a ceramic cloth belt, and projection teeth for biting into said ceramic cloth belt are formed on the circumferential surface of said drive roller.

19. A belt conveyance baking furnace in which a workpiece to be baked is subjected to baking while said workpiece is located on a conveyor belt and conveyed through said furnace, comprising:

a drive roller for driving said conveyor belt and is disposed outside said furnace, and a plurality of furnace bed rollers supporting the lower surface of said conveyor belt and driven at the same circumferential speed as said drive roller, said plurality of furnace bed rollers being arranged in said furnace and arranged side by side in the longitudinal direction, wherein at least one of said plurality of furnace bed rollers includes flanges at both ends, said at least one furnace bed roller for preventing zigzag movement of said conveyor belt.

20. A method in accordance with claim 12, further comprising the step of preventing zigzag movement of the conveyor belt by providing at least one of said plurality of furnace bed rollers with flanges at both ends.

21. A belt conveyance baking furnace according to claim 15, wherein at least one of said plurality of furnace bed rollers includes flanges at both ends, said at least one furnace bed roller for preventing zigzag movement of the conveyor belt.

* * * * *